(12) United States Patent
Kim et al.

(10) Patent No.: US 10,952,025 B2
(45) Date of Patent: Mar. 16, 2021

(54) METHOD AND DEVICE FOR GENERATING NOVEL MOVING LINE INFORMATION BASED ON PREVIOUS MOVING LINE INFORMATION

(71) Applicant: Samsung Electronics Co., Ltd., Suwon-si (KR)

(72) Inventors: Hyun-Jung Kim, Suwon-si (KR); Seong-Hwan Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/062,451

(22) PCT Filed: Dec. 16, 2016

(86) PCT No.: PCT/KR2016/014804
§ 371 (c)(1),
(2) Date: Jun. 14, 2018

(87) PCT Pub. No.: WO2017/105132
PCT Pub. Date: Jun. 22, 2017

(65) Prior Publication Data
US 2018/0376287 A1 Dec. 27, 2018

(30) Foreign Application Priority Data
Dec. 16, 2015 (KR) .................. 10-2015-0180325

(51) Int. Cl.
*H04W 24/00* (2009.01)
*H04W 4/02* (2018.01)
(Continued)

(52) U.S. Cl.
CPC ........ *H04W 4/027* (2013.01); *G06Q 30/0255* (2013.01); *G06Q 30/0261* (2013.01);
(Continued)

(58) Field of Classification Search
CPC . G01S 5/02; G01S 5/0252; G01S 5/01; G01S 5/0295; G01S 2205/09;
(Continued)

(56) References Cited

U.S. PATENT DOCUMENTS 8,073,460 B1 * 12/2011 Scofield .................. H04W 4/21
455/456.1
8,843,158 B2 * 9/2014 Nagaraj ................ G01S 5/0257
455/456.2
(Continued)

FOREIGN PATENT DOCUMENTS

CN 103473679 A 12/2013
CN 105115510 A 12/2015
(Continued)

OTHER PUBLICATIONS

European Search Report dated Sep. 20, 2018, issued in European Patent Application No. 16876074.2.
(Continued)

*Primary Examiner* — Shantell L Heiber
(74) *Attorney, Agent, or Firm* — Jefferson IP Law, LLP

(57) ABSTRACT

Disclosed is a technology for a sensor network, machine to machine (M2M) communication, machine type communication (MTC), and the Internet of Things (IoT). The disclosed technology can be used for intelligent services (smart home, smart building, smart city, smart car or connected car, health care, digital education, retail, security and safety-related services, and the like) based on the technology. A terminal according to one embodiment of the present disclosure generates previous moving line information based on a movement path of the terminal, transmits the generated previous moving line information to a server, and receives, from the server, new moving line information generated based on the transmitted previous moving line information.

14 Claims, 11 Drawing Sheets

(51) Int. Cl.
*H04W 4/021* (2018.01)
*H04W 8/20* (2009.01)
*H04W 88/18* (2009.01)
*H04W 4/80* (2018.01)
*H04W 4/70* (2018.01)
*H04W 4/029* (2018.01)
*G06Q 30/02* (2012.01)
*G06Q 50/22* (2018.01)

(52) U.S. Cl.
CPC .......... *H04W 4/021* (2013.01); *H04W 4/029* (2018.02); *H04W 4/70* (2018.02); *H04W 4/80* (2018.02); *H04W 8/20* (2013.01); *H04W 88/18* (2013.01); *G06Q 50/22* (2013.01)

(58) Field of Classification Search
CPC .. H04L 29/08657; H04W 4/02; H04W 4/029; H04W 64/00
See application file for complete search history.

(56) References Cited

U.S. PATENT DOCUMENTS

| | | | |
|---|---|---|---|
| 8,886,217 B2 | 11/2014 | Reitter et al. | |
| 9,516,470 B1* | 12/2016 | Scofield | H04W 4/029 |
| 9,769,622 B2* | 9/2017 | Patel | H04W 4/029 |
| 10,171,935 B1* | 1/2019 | Reyes | H04W 4/021 |
| 2009/0276154 A1* | 11/2009 | Subramanian | G01C 21/20 |
| | | | 701/469 |
| 2010/0010733 A1 | 1/2010 | Krumm | |
| 2010/0217525 A1* | 8/2010 | King | G06Q 30/02 |
| | | | 701/300 |
| 2010/0301993 A1 | 12/2010 | Abuelsaad et al. | |
| 2011/0046878 A1* | 2/2011 | Sung | H04W 12/06 |
| | | | 701/467 |
| 2012/0115476 A1* | 5/2012 | Shin | H04W 4/021 |
| | | | 455/435.1 |
| 2013/0217414 A1 | 8/2013 | Nagaraj | |
| 2013/0325746 A1* | 12/2013 | Kapicioglu | G06Q 30/0631 |
| | | | 705/347 |
| 2014/0136099 A1* | 5/2014 | Choi | G01C 21/32 |
| | | | 701/453 |
| 2014/0187200 A1 | 7/2014 | Reitter et al. | |
| 2015/0005011 A1 | 1/2015 | Nehrenz et al. | |
| 2015/0006290 A1 | 1/2015 | Tomkins et al. | |
| 2015/0031392 A1 | 1/2015 | Un et al. | |
| 2015/0140982 A1 | 5/2015 | Postrel | |
| 2015/0170207 A1 | 6/2015 | Postrel | |
| 2015/0186982 A1 | 7/2015 | Higgins et al. | |
| 2015/0330805 A1 | 11/2015 | Cho et al. | |
| 2016/0127209 A1* | 5/2016 | Singh | H04W 24/02 |
| | | | 455/435.2 |

FOREIGN PATENT DOCUMENTS

| | | |
|---|---|---|
| JP | 2017-111541 A1 | 6/2017 |
| KR | 10-1547489 B1 | 8/2015 |
| KR | 10-2015-0131934 A | 11/2015 |
| WO | 2012/176973 A1 | 12/2012 |
| WO | 2015/102456 A1 | 7/2015 |
| WO | 2015/174764 A1 | 11/2015 |

OTHER PUBLICATIONS

Chinese Office Action dated Dec. 4, 2019, issued in Chinese Patent Application No. 201680074763.8.
Maita et al., "A Study on Prototype of RFID/GIS Connection Server and Its Application for Universally Designed Tourist Information System", Mar. 17, 2006.
Examination report dated Nov. 24, 2020, issued in Japanese Office Action in Application No. 2018-531547.

* cited by examiner

METHOD AND DEVICE FOR GENERATING NOVEL MOVING LINE INFORMATION BASED ON PREVIOUS MOVING LINE INFORMATION

CROSS-REFERENCE TO RELATED APPLICATION(S)

This application is a U.S. National Stage application under 35 U.S.C. § 371 of an International application number PCT/KR2016/014804, filed on Dec. 16, 2016, which is based on and claimed priority of a Korean patent application number 10-2015-0180325, filed on Dec. 16, 2015, in the Korean Intellectual Property Office, the disclosure of which is incorporated by reference herein in its entirety.

BACKGROUND

1. Field

The present disclosure relates to a method and apparatus for generating new moving line information based on previous moving line information.

2. Description of the Related Art

The Internet has evolved from a human-centered connection network in which humans create and consume information, into the Internet of things (IoT) in which distributed components such as electrical and electronic components exchange and process information. For example, in the Internet of everything (IoE), big data processing technology is combined with IoT technology through a connection to a cloud server and the like.

In order to implement the IoT, technology elements such as sensing technology, wired/wireless communication, network infrastructure, service interface technology, security technology, and so on are required. In this context, research has recently been conducted on technologies such as sensor networks, machine to machine (M2M) communication, machine type communication (MTC), and so on.

In the IoT environment, intelligent Internet technology (IT) services of creating new values in human living by collecting and analyzing data generated from connected things may be provided. The IoT may be applied to the fields including smart homes, smart buildings, smart cities, smart cars or connected cars, smart grids, healthcare, smart appliances, and advanced medical services through convergence between existing IT technologies and various industries.

Meanwhile, as smartphones have been widely used, it is possible to acquire moving line information about users through mobile devices such as smartphones, and attempts have been made continuously to provide various services based on moving line information about users in the retail sector. However, tracking the location of a user irrespective of the user's intention may annoy the user, thereby making it difficult to use moving line information about users in various services.

Accordingly, there is a need for a method for providing moving line information about a user according to the user's intention, and providing various services based on the moving line information.

SUMMARY

An aspect of the present disclosure is to provide a method and apparatus for generating new moving line information based on previous moving line information.

Another aspect of the present disclosure is to provide a method and apparatus for generating new moving line information, upon request of a terminal.

Another aspect of the present disclosure is to provide a method and apparatus for generating new moving line information, in consideration of information about a user having a terminal.

In accordance with an aspect of the present disclosure, a method for receiving new moving line information by a terminal comprise generating previous moving line information based on a movement path of the user terminal, transmitting the generated previous moving line information to a server, and receiving, from the server, new moving line information generated based on the transmitted previous moving line information.

In accordance with another aspect of the present disclosure, a method for transmitting new moving line information by a server comprises receiving, from a terminal, previous moving line information generated based on a movement path of the terminal, generating new moving line information based on the received previous moving line information, and transmitting the generated new moving line information to the terminal.

In accordance with another aspect of the present disclosure, a terminal comprises a processor configured to generate previous moving line information based on a movement path of the terminal, a transmitter configured to transmit the generated previous moving line information to a server, and a receiver configured to receive, from the server, new moving line information generated based on the transmitted previous moving line information.

In accordance with another aspect of the present disclosure, a server comprises a receiver configured to receive, from a user terminal, previous moving line information generated based on a movement path of the user terminal, a processor configured to generate new moving line information based on the received previous moving line information, and a transmitter configured to transmit the generated new moving line information to the terminal.

Other aspects, benefits, and core features of the present disclosure will be processed in conjunction with the attached drawings and will be obvious to a person skilled in the art from the following detailed description of preferred embodiments of the present disclosure.

An embodiment of the present disclosure has generates new moving line information based on previous moving line information.

Further, an embodiment of the present disclosure generates new moving line information, upon request of a terminal.

Further, an embodiment of the present disclosure generates new moving line information, in consideration of information about a user having a terminal.

BRIEF DESCRIPTION OF THE DRAWINGS

The above and other aspects, features and advantages of the present disclosure will be more apparent from the following detailed description taken in conjunction with the accompanying drawings, in which.

It is to be noted that like reference numerals denote the same or similar elements, features, and structures through the drawings.

DETAILED DESCRIPTION

Hereinbelow, embodiments of the present disclosure will be described in detail with reference to the attached drawings.

According to various embodiments of the present disclosure, an electronic device may have communication functionality. For example, an electronic device may be at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or an wearable device (for example, a head-mounted device (HMD)), electronic clothes, an electronic bracelet, an electronic necklace, electronic appcessory, an electronic tattoo, or a smart watch).

According to various embodiments of the present disclosure, an electronic device may be a smart home appliance having the communication functionality. For example, the smart home appliance may be at least one of a television (TV), a digital versatile disk (DVD) player, an audio player, a refrigerator, an air conditioner, a vacuum cleaner, an oven, a microwave oven, a washer, a drier, an air purifier, a set-top box, a media box (for example, Samsung HomeSync™, Apple TV™, or Google TV™), a game console, an electronic dictionary, a camcorder, or an electronic picture frame.

According to various embodiments of the present disclosure, an electronic device may be at least one of a medical device (for example, a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (for example, a naval navigation device, a gyroscope, or a compass), an avionic electronic device, a security device, or an industrial or consumer robot.

According to various embodiments of the present disclosure, an electronic device may be at least one of furniture, a part of a building/structure, an electronic board, an electronic signature receiving device, a projector, or various measuring devices (for example, water, electricity, gas or electromagnetic wave measuring devices), which has the communication functionality.

According to various embodiments of the present disclosure, an electronic device may be a combination of two or more of the foregoing devices. Further, it will be obvious to those skilled in the art that an electronic device according to preferred embodiments of the present disclosure is not limited to the foregoing devices.

Figure 1:
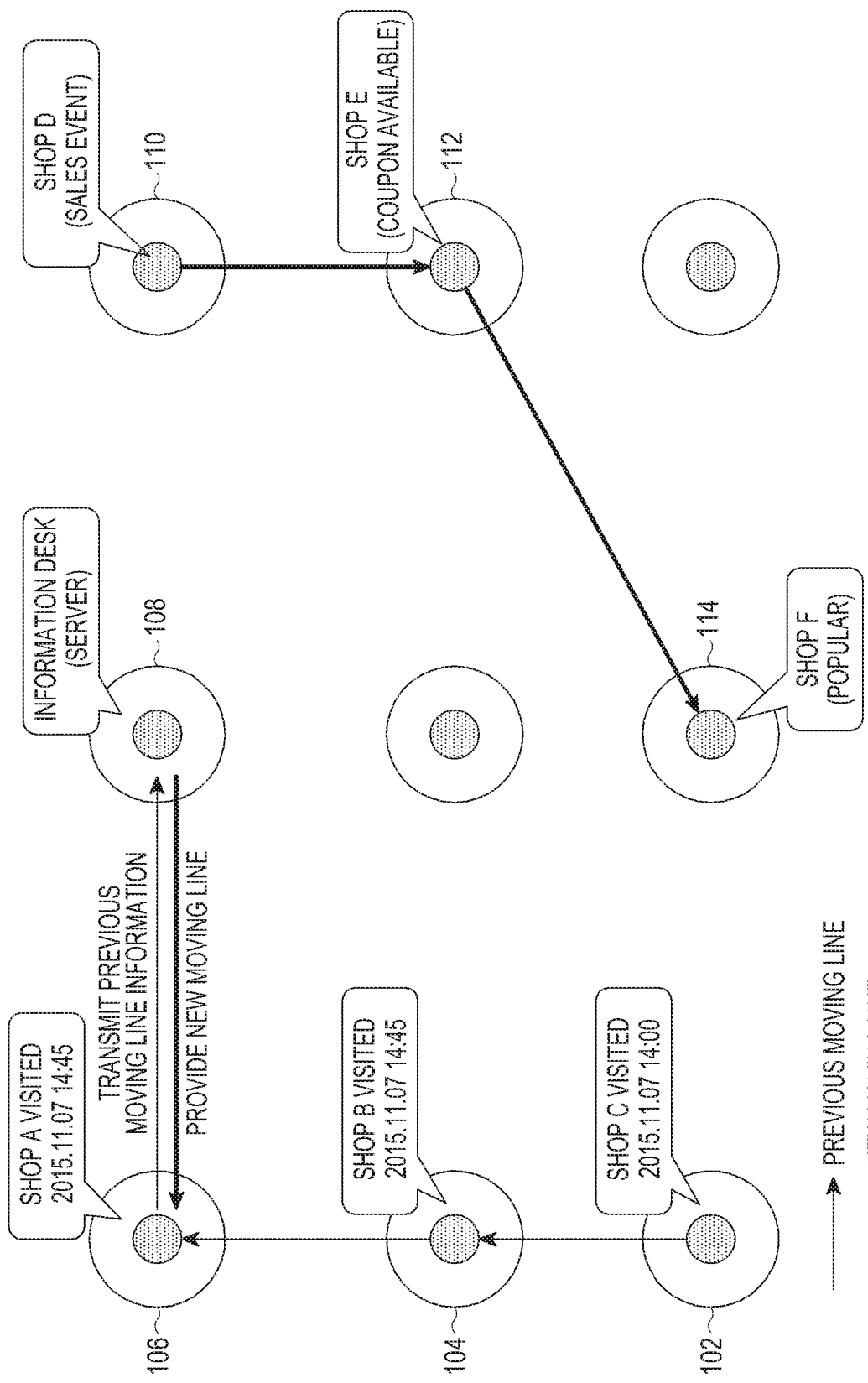
FIG. 1 is a diagram illustrating an example of generating new moving line information based on previous moving line information according to an embodiment of the present disclosure.

FIG. 1 is a diagram illustrating an example of generating new moving line information based on previous moving line information according to an embodiment of the present disclosure.

Referring to FIG. 1, a scenario in which a customer intending to purchase clothes has visited a shopping mall and is doing the shopping is assumed. It is also assumed that the customer moves in the order of a shop C 102→a shop B 104→a shop A 106. In addition, it is assumed that a signal generator for transmitting a signal used to determine whether a customer has visited a shop has been installed in each shop, and a server for generating new moving line information based on a movement path of a user and providing the new moving line information has been installed at an information desk 108. Various types of signal generators are available, which generate contiguous frequencies from a low frequency to a high radio frequency, generate a single frequency, and so on according to usages. The signal generator is used for communication such as wireless fidelity (Wi-Fi) communication, biology technology (BT) communication, zigbee communication, Z-wave communication, infrared (IR) communication, visible light communication (VLC), or cellular communication. Further, the signal generator may be mainly, but not limited to, a product-embedded type, a separately attached type, an electric shelf label (ESL) type, or the like. In an embodiment of the present disclosure, the signal generator transmits a periodically generated wireless communication signal, for example, a beacon signal, and the beacon signal is used to determine proximity to a specific area based on a received signal strength. The signal generator which transmits this beacon signal may operate by a battery with low power, may not need an additional power source, and may be manufactured in a size as small as a coin. Thus, the signal generator may be configured easily in various environments irrespective of indoors and outdoors. Further, the beacon signal enables accurate measurement with an error of about 5 cm. Since the beacon signal reaches up to 50 m according to an output configuration, the signal generator may be configured easily in a daily living environment.

The customer, who has visited the shopping mall, visits the shop C 102, and an electronic device carried by the customer, for example, a smartphone, a tablet PC, or a wearable device receives a beacon signal C from a signal generator C installed in the shop C 102. In embodiments of the present disclosure as described later, an electronic device carried by a customer is referred to as a user terminal. The user terminal extracts a beacon identity (ID) from the received beacon signal C, and stores the extracted beacon ID and information about a time of receiving the beacon signal C, for example, 2:00 PM (14:00), Nov. 7, 2015.

Then, the customer visits the shop B 104, and the user terminal receives a beacon signal B from a signal generator B installed in the shop B 104. The user terminal extracts a beacon ID from the received beacon signal B, and stores the extracted beacon ID and information about a time of receiving the beacon signal B, for example, 2:15 PM (14:15), Nov. 7, 2015.

Finally, the customer visits the shop A 106, and the user terminal receives a beacon signal A from a signal generator A installed in the shop A 106. The user terminal extracts a beacon ID from the received beacon signal A, and stores the extracted beacon ID and information about a time of receiving the beacon signal A, for example, 2:45 PM (14:45), Nov. 7, 2015.

It has been described herein by way of example that a user terminal extracts a beacon ID from a received beacon signal, and stores the extracted beacon ID and information about a time of receiving the beacon signal in a storage of the user terminal. However, the user terminal may measure the received signal strength of the beacon signal, and only if the measured received signal strength is equal to or larger than a received signal strength preset by the user, the user terminal may extract the ID of the beacon signal and store the beacon ID. Or only if the extracted beacon ID matches to category information preset by the user, the user terminal may store the beacon ID. For example, the customer, who has visited the shopping mall, would look around only clothes shops to purchase clothes and thus may preset category information for the user terminal to clothes shops. In this case, only if the extracted beacon ID identifies a clothes shop, the user terminal stores the extracted beacon ID. The category information about the user terminal may be set, for example, by an application related to recommendation of a moving line, installed in the user terminal.

If the customer who has visited the shops C, B and A 102, 104, and 106 wants to receive new moving line information based on which the customer may efficiently do the shopping to purchase clothes, the customer transmits moving line information about the customer stored in the user terminal to the server installed at the information desk 108. That is, the user terminal transmits, to the server, the pre-stored beacon IDs and information about the reception times of the beacon signals including the beacon IDs. Besides this information, the user terminal may additionally transmit user information. The user information may be, for example, a customer ID, membership information (a customer class or the like) about the customer, information about a coupon available to the customer, and a previous purchase history of the customer.

Further, when transmitting the pre-stored beacon IDs and the reception time information about the beacon signals including the beacon IDs, the user terminal may set an intended category, and selectively transmit, to the server, only beacon IDs matching the set category, and reception time information about beacon signals including the beacon IDs. Since FIG. 1 is based on the scenario in which a customer intending to purchase clothes visits a shopping mall and does the shopping, the user terminal may transmit, to the server, only beacon IDs related to clothes and reception time information about beacon signals including the beacon IDs among the pre-stored beacon IDs and the reception time information about the beacon signals including the beacon IDs.

Upon receipt of previous moving line information about the customer, that is, the beacon IDs and the reception time information about the beacon signals including the beacon IDs from the user terminal, the server detects shops that the customer has visited and products that the customer wants based on information included in the beacon IDs, and detects a movement path of the customer and a time for which the customer has stayed in each shop based on the reception time information about the beacon signals.

Upon detection of the movement path of the user and the time for which the user has stayed in each shop, the server generates a new moving line to be provided to the customer, for efficient shopping, and provides the generated new moving line to the customer through the user terminal. The server generates the new moving line basically in such a manner that the customer may efficiently look around additional shops, for purchasing clothes, among shops that the customer has not visited yet. In FIG. 1, a new moving line is generated so that the customer may visit in the order of a shop D 110 having a sales event, a shop E 112 in which a coupon available to the customer may be used, and a popular shop F 114, and provided to the customer through the user terminal. Herein, the server may provide sales information about the shops D, E and F 110, 112, and 114 included in the generated new moving line, and information about coupons which may be used in the shops D, E and F 110, 112, and 114, along with the generated new moving line.

In another example, the server may generate a new moving line in additional consideration of user information transmitted by the user terminal, for example, the previous purchase history of the user. That is, the server may generate the new moving line so that the customer may look around shops in which the customer has purchased goods or shops having a group of goods similar to previously purchased goods, with priority.

In another example, the server may generate a new moving line in additional consideration of user information transmitted by the user terminal, for example, membership information about the user and coupons available to the user. That is, the server may generate the new moving line so that the customer may look around shops in which the coupons available to the user may be used or shops visited much by other users of the same customer class as the user, with priority.

In another example, if the customer is to purchase clothes in a short time due to the customer's schedule, the server may generate a new moving line in consideration of a movement distance so that the customer may finish the shopping in a minimal time.

Further, the server may generate a specific one new moving line and provide the generated new moving line to the customer through the user terminal. Also, the server may provide a plurality of new moving lines generated in consideration of different parameters so that the customer may select a desired moving line.

With reference to FIG. 1, it has been described that a customer, who has visited a shopping mall and is doing the shopping, transmits, to a server, information about a previous moving line from the time of vising the shopping mall to a current time, and the server generates a new moving line for efficient shopping of the customer, and recommends the new moving line to the customer, by way of example. However, the customer, who has visited the shopping mall, may transmit moving line information of a previous visit to the shopping mall to the server, and receive a new moving line generated based on the previous moving line information from the server. In this case, the server may additionally provide coupon information, sales information, and so on to the re-visiting customer having a purchase history, in consideration of a purchase history at a previous visit.

Figure 2:
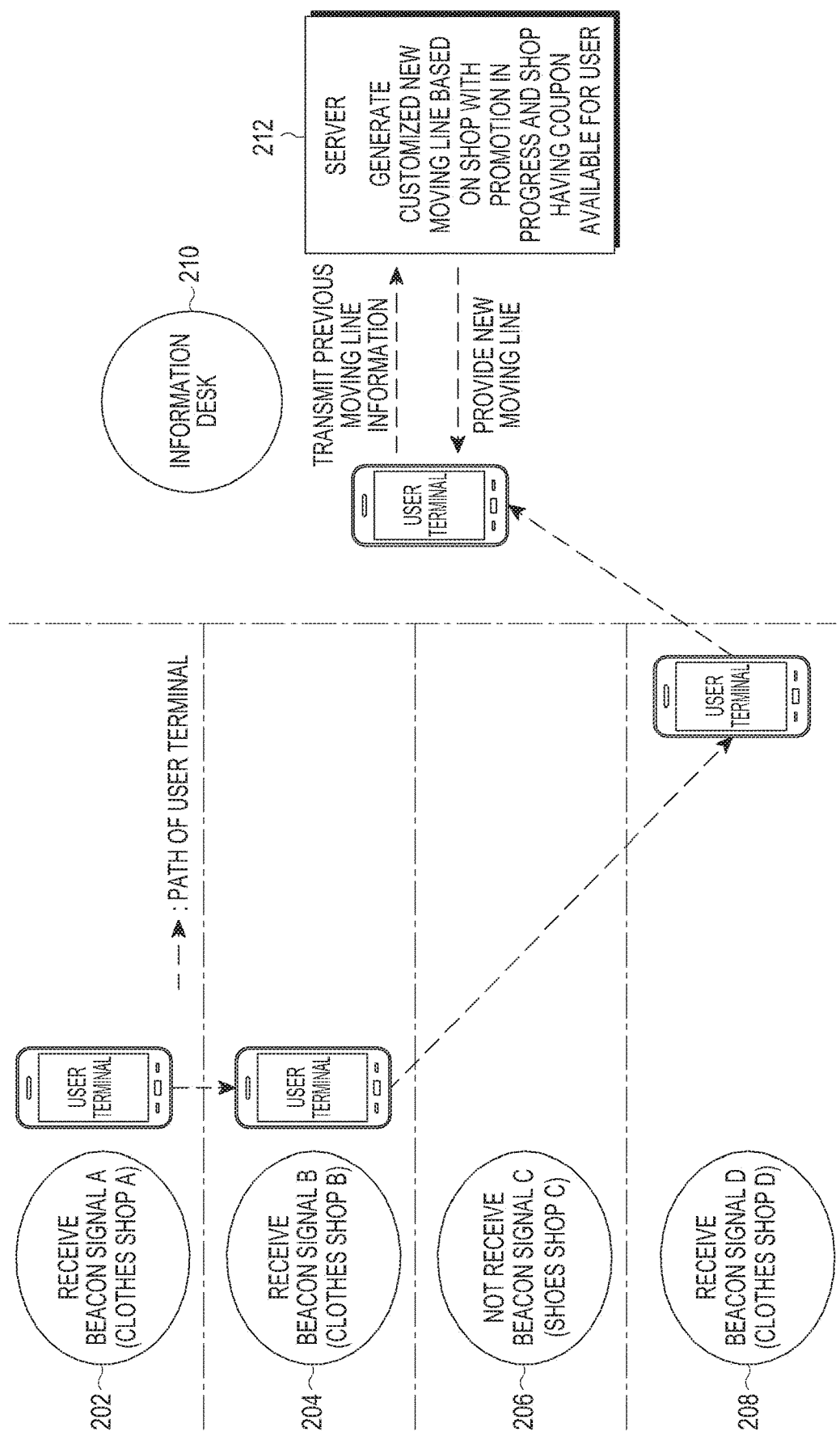
FIG. 2 is a diagram illustrating another example of generating new moving line information based on previous moving line information according to the embodiment of the present disclosure.

FIG. 2 is a diagram illustrating another example of generating new moving line information based on previous moving line information according to the embodiment of the present disclosure.

Referring to FIG. 2, a scenario in which a customer intending to purchase clothes has visited a shopping mall and is doing the shopping is assumed. It is also assumed that the shopping mall includes, for example, clothes shops A 202, B 202, and D 208, a shoes shop C 206, and an information desk 210. In addition, it is assumed that a signal generator for transmitting a signal used to determine whether a customer has visited a shop has been installed in each shop, and a server for generating a new moving line and providing the new moving line to a customer has been installed at the information desk 210.

When the user visits the clothes shop A 202, the user terminal receives a beacon signal A from a signal generator installed in the clothes shop A 202. The beacon signal may include, for example, a preamble area, an access address area, a protocol data unit (PDU) area, and a cyclic redundancy check (CRC) area. The beacon signal will be described later in greater detail with reference to FIG. 5.

The user terminal extracts a beacon ID from the received beacon signal A, and stores the extracted beacon ID and information about a time of receiving the beacon signal A. The beacon ID extracted from the beacon signal may include, for example, a unique user identifier (UUID) for identifying the shopping mall, a major ID, and a minor ID.

If the user visits the clothes shop B 204 after visiting the clothes shop A 202, the user terminal receives a beacon signal B from a signal generator installed in the clothes shop B 204. The user terminal extracts a beacon ID from the received beacon signal B, and stores the extracted beacon ID and information about a time of receiving the beacon signal B.

If the user visits the clothes shop D 208 after visiting the clothes shop B 204, the user terminal receives a beacon signal D from a signal generator installed in the clothes shop D 208. The user terminal extracts a beacon ID from the received beacon signal D, and stores the extracted beacon ID and information about a time of receiving the beacon signal D.

FIG. 2 is based on the scenario in which the user terminal moves in the path of the clothes shop A 202→the clothes shop B 204→the clothes shop D 208. Therefore, the user terminal does not receive a beacon signal C from a signal generator installed in the shoes shop C 206 which the user has just passed by without visiting.

It has been described herein by way of example that a user terminal extracts a beacon ID from a received beacon signal, and stores the extracted beacon ID and information about a time of receiving the beacon signal in a storage of the user terminal. However, the user terminal may measure the received signal strength of the beacon signal, and only if the measured received signal strength is equal to or larger than a received signal strength preset by the user, the user terminal may extract the beacon ID of the beacon signal and store the beacon ID. Or only if the extracted beacon ID matches to category information preset by the user, the user terminal may store the beacon ID. For example, the customer, who has visited the shopping mall, would look around only clothes shops to purchase clothes and thus may preset category information for the user terminal to clothes shops. In this case, only if the extracted beacon ID identifies a clothes shop, the user terminal stores the extracted beacon ID. The category information about the user terminal may be set, for example, by an application related to recommendation of a moving line, installed in the user terminal.

The user terminal which has moved in the path of the clothes shop A 202→the clothes shop B 204→the clothes shop D 208 may request new moving line information to the server 212 installed at the information desk 210 to provide efficient shopping information later to the user. That is, the user terminal may request new moving line information to the server 212 by transmitting previous moving line information stored in the storage to the server 212 by an installed application. Herein, the previous moving line information stored in the storage means the beacon ID extracted from the beacon signal received at each visited clothes shop, and information about a time of receiving the beacon signal.

When the user terminal requests the new moving line information to the server 212, the user terminal may additionally transmit user information such as a user ID, membership information (customer class) about the user, information about a coupon available to the user, and a previous purchase history of the user, as well as the previous moving line information.

Further, when transmitting pre-stored beacon IDs and reception time information about beacon signals including the beacon IDs in order to request recommendation of a new moving line, the user terminal may selectively transmit only a beacon ID included in a preset category, and reception time information about a beacon signal including the beacon ID to the server.

Upon receipt of the previous moving line information, that is, the beacon IDs and the reception time information about the beacon signals including the beacon IDs from the user terminal, the server 212 detects shops that the user terminal has visited and products that the user terminal finds for based on shopping mall information, shop information, and product information included in the beacon IDs, and the reception time information about the beacon signals including the beacon IDs. The server 212 detects a movement path of the user terminal and a time for which the user terminal has stayed in each zone based on the reception time information about the beacon signals.

The server 212 generates new moving line information to be provided to the user terminal, based on information about the shops visited by the user terminal, information related to a product that the user terminal finds for, the movement path of the user terminal, and the time for which the user terminal has stayed in each shop. That is, the server 212 determines shops to be visited additionally from among shops that the user terminal has not visited yet, in consideration of shops having a promotion event and shops in which coupons available to the user terminal may be used. Then, the server 212 generates a new moving line customized for the user based on the result of the determination, and provide information about the generated new moving line to the user terminal. Herein, the server 212 may provide information (for example, promotion information, information about products for sale, and price information) about shops included in the new moving line, and coupons which may be used in shops, along with the new moving line information.

Further, the server 212 may generate a specific one new moving line and provide information about the generated new moving line to the user terminal. Also, the server may provide a plurality of new moving lines generated in consideration of different parameters so as to prompt the user terminal to select a desired moving line. Herein, the information about the plurality of new moving lines generated in consideration of different parameters may be generated basically in consideration of the movement path of the user terminal, and the time for which the user terminal has stayed in each shop, and further in consideration of the previous purchase history of the user terminal, the membership information about the user terminal, information about coupons available to the user terminal, or a movement distance for the purpose of finishing shopping in a short time.

With reference to FIG. 2, it has been described that a new moving line is generated based on previous moving line information and provided to a customer who wants to purchase clothes in a shopping mall, by way of example. However, the new moving line providing technique described with reference to FIG. 2 may be applied to various fields. For example, the new moving line providing technique may be used to efficiently arrange manpower within a building, to guide a patient to an additional place to visit in an examination room and a doctor's office of a clinic, and to control an in-house environment (illumination, temperature, humidity, and so on) based on a moving line of a resident in a smart home system.

Figure 3:
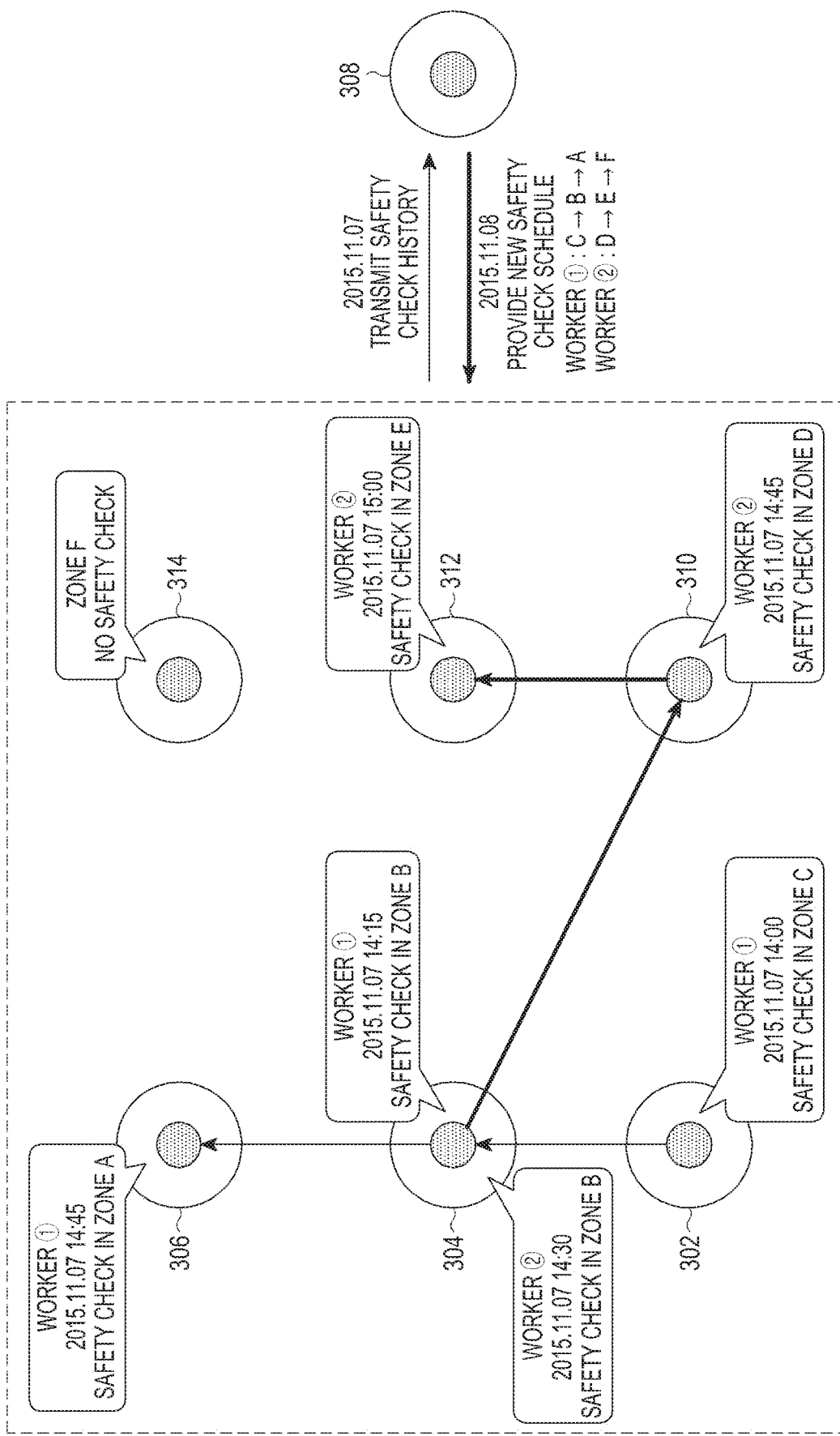
FIG. 3 is a diagram illustrating an example of generating new moving line information based on previous moving line information according to another embodiment of the present disclosure.

FIG. 3 is a diagram illustrating an example of generating new moving line information based on previous moving line information according to another embodiment of the present disclosure.

Referring to FIG. 3, a scenario in which two workers perform a safety check in a specific building is assumed, and it is assumed that worker 1 moves in the path of a zone C 302→a zone B 304→a zone A 306, and worker 2 moves in the path of the zone B 304→a zone D 310→a zone E 312. Further, it is assumed that a signal generator for transmitting a signal used to determine whether a worker has visited a zone is installed in each zone, and a server is installed in a specific zone 308 among the zones, for generating a new work schedule including a new moving line based on a movement path of a worker, and providing the new work schedule.

Worker 1, who has started work, performs a safety check by visiting the zone C 302, and a user terminal carried by worker 1, for example, a smartphone, a tablet PC, or a wearable device receives a beacon signal C from a signal generator C installed in the zone C 302. The user terminal extracts a beacon ID from the received beacon SIGNAL C, and stores the extracted beacon ID and information about the reception time of the beacon signal C, for example, 2015, 11, 07, 2:00 PM (14:00).

Then, worker 1 visits the zone B 304 and checks the safety of the zone B 304. The user terminal receives a beacon signal B from a signal generator B installed in the zone B 304. The user terminal extracts a beacon ID from the received beacon signal B, and stores the extracted beacon ID and information about the reception time of the beacon signal B, for example, 2015, 11, 07, 2:15 PM (14:15).

Finally, worker 1 visits the zone A 306 and checks the safety of the zone A 306. The user terminal receives a beacon signal A from a signal generator A installed in the zone A 306. The user terminal extracts a beacon ID from the received beacon signal A, and stores the extracted beacon ID and information about the reception time of the beacon signal A, for example, 2015, 11, 07, 2:45 PM (14:45).

Worker 2, who has started work, performs a safety check by visiting the zone B 304, and a user terminal carried by worker 2 receives the beacon signal B from the signal generator B installed in the zone B 304. The user terminal extracts the beacon ID from the received beacon signal B, and stores the extracted beacon ID and information about the reception time of the beacon signal B, for example, 2015, 11, 07, 2:30 PM (14:30).

Then, worker 2 visits the zone D 310 and checks the safety of the zone D 310. The user terminal receives a beacon signal D from a signal generator D installed in the zone D 310. The user terminal extracts a beacon ID from the received beacon signal D, and stores the extracted beacon ID and information about the reception time of the beacon signal D, for example, 2015, 11, 07, 2:45 PM (14:45).

Finally, worker 2 visits the zone E 312 and checks the safety of the zone E 312. The user terminal receives a beacon signal E from a signal generator E installed in the zone E 312. The user terminal extracts a beacon ID from the received beacon signal E, and stores the extracted beacon ID and information about the reception time of the beacon signal E, for example, 2015, 11, 07, 3:00 PM (15:00).

Herein, it has been described, by way of example, that a user terminal extracts a beacon ID from a received beacon signal, and stores the extracted beacon ID and reception time information about the beacon signal in a storage of the user terminal. However, the user terminal may measure the received signal strength of the beacon signal, and only if the measured signal strength is equal to or larger than a preset received signal strength, the user terminal may extract the beacon ID from the beacon signal, and store the extracted beacon ID. Or only if the extracted beacon ID matches to user-preset category information, the user terminal may store the beacon ID. For example, since a worker performing a safety check would visit only zones requiring a safety check, category information of the user terminal may be preset to a zone requiring a safety check. In this case, only if the extracted beacon ID matches to a zone requiring a safety check, the user terminal stores the extracted beacon ID. Herein, the user terminal may set category information, for example, by an application related to recommendation of a work schedule, installed in the user terminal.

If a worker which has completed a safety check in each zone wants to receive new work schedule information, for a more efficient work, the worker transmits a safety check history including moving line information about the worker, stored in a user terminal, to the server installed in the zone 308. That is, each of the user terminals carried by worker 1 and worker 2 transmits the pre-stored beacon IDs and the reception time information about the beacon signals including the beacon IDs to the server. Herein, the user terminal may additionally transmit user information as well as this information. The user information may be, for example, a worker ID, a division to which the worker belongs to, and the worker's job, career, and skill.

In addition, when transmitting pre-stored beacon IDs and reception time information about beacon signals including the beacon IDs, the user terminal may set a desired category, and selectively transmit only a beacon ID included in the set category, and reception time information about a beacon signal including the beacon ID to the server. Since FIG. 3 is based on the scenario in which a worker performs a safety check in a specific building, the user terminal may transmit, to the server, only a beacon ID matching to a zone requiring a safety check, and reception time information about a beacon signal including the beacon ID, from among pre-stored beacon IDs and reception time information about beacon signals including the beacon IDs.

Upon receipt of previous moving line information about each worker, that is, beacon IDs and reception time information about beacon signals including the beacon IDs from a user terminal, the server detects zones that the worker has visited for a safety check based on information included in the beacon IDs, and detects a movement path of the worker and a time for which the worker has stayed in each shop based on the reception time information about the beacon signals.

Upon detection of the movement path of each worker and the time for which the worker has stayed in each zone, the server generates a new work schedule to be provided to the worker, for efficient work, and provides the generated new work schedule to the worker through the user terminal. The server basically generates the new work schedule in such a manner that there would be no zone in which a safety check is skipped or performed redundantly.

In FIG. 3, a new work schedule is generated so that worker 1 may perform a safety check in the order of the zone C 302→the zone B 304→the zone A 306, and worker 2 may perform a safety check in the order of the zone D 310→the zone E 312→the zone F 314, and provided to each of the workers through the user terminal. Herein, the server may provide the worker with information about each zone included in the generated new work schedule, for example, a facility requiring a safety check in a corresponding zone.

Figure 4:
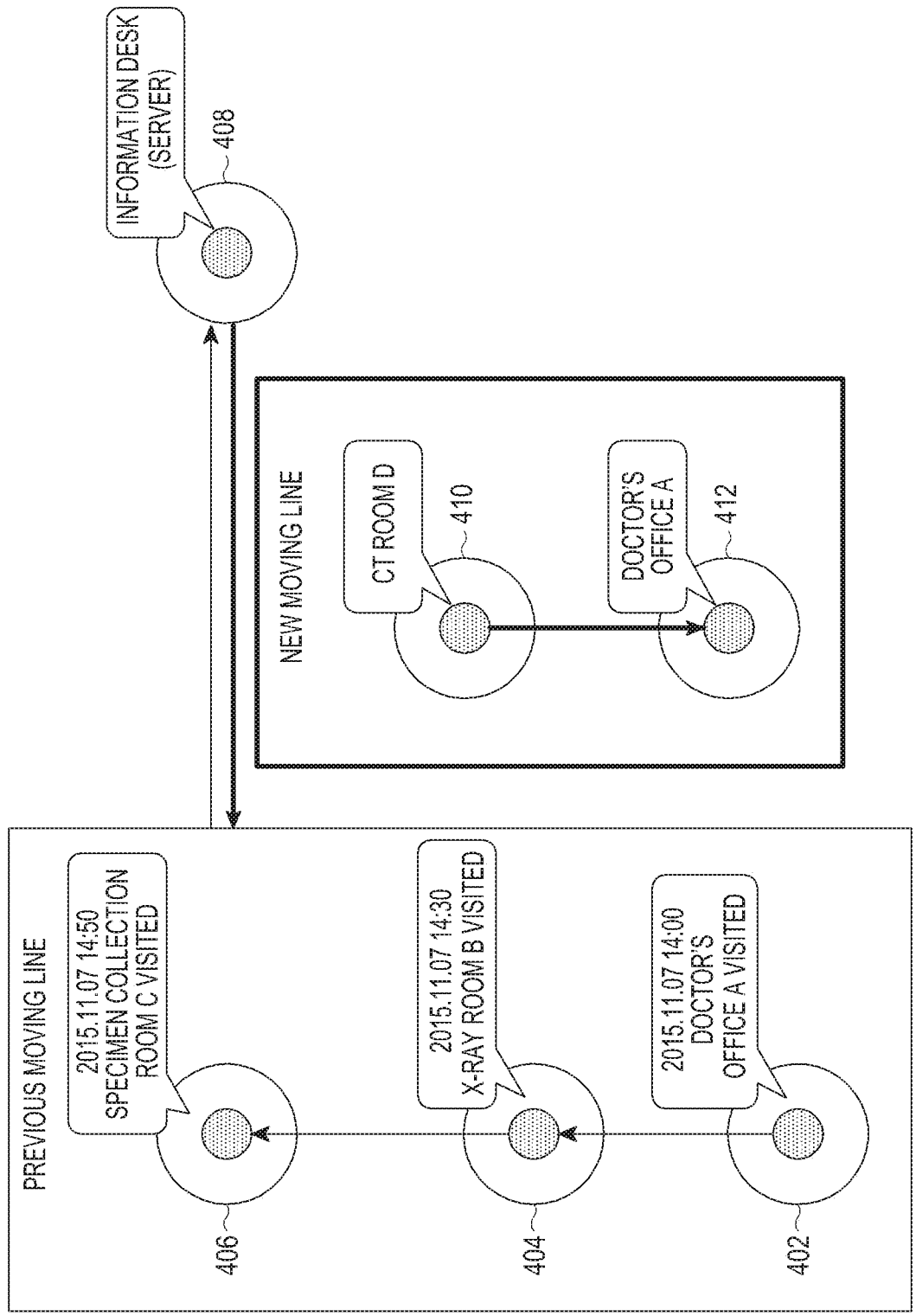
FIG. 4 is a diagram illustrating an example of generating new moving line information based on previous moving line information according to another embodiment of the present disclosure.

FIG. 4 is a diagram illustrating an example of generating new moving line information based on previous moving line information according to another embodiment of the present disclosure.

Referring to FIG. 4, a scenario in which a patient visits a hospital and is taking a medical checkup is assumed, and it is assumed that the patient moves in the path of a doctor's office A 402→an X-ray room B 404→a specimen collection room C 406. Further, it is assumed that a signal generator for transmitting a signal used to determine whether a patient has visited a corresponding area is installed in each of doctor's offices and examination rooms in the hospital, and a server is installed at an information desk 408, for generating a new moving line based on a movement path of a patient, and providing the new moving line.

If a patient, who has visited the hospital, enters the doctor's office A 402, a user terminal carried by the patient, for example, a smartphone, a tablet PC, or a wearable device receives a beacon signal A from a signal generator A installed in the doctor's office A 402. The user terminal extracts a beacon ID from the received beacon signal A, and stores the extracted beacon ID and information about the reception time of the beacon signal A, for example, 2:00 PM (14:00), Nov. 7, 2015.

Then, if the patient visits the X-ray room B 404, the user terminal receives a beacon signal B from a signal generator B installed in the X-ray room B 404. The user terminal extracts a beacon ID from the received beacon signal B, and stores the extracted beacon ID and information about the reception time of the beacon signal B, for example, 2:30 PM (14:30), Nov. 7, 2015.

Finally, if the patient visits the specimen collection room C 406, the user terminal receives a beacon signal C from a signal generator C installed in the specimen collection room C 406. The user terminal extracts a beacon ID from the received beacon signal C, and stores the extracted beacon ID and information about the reception time of the beacon signal C, for example, 2:50 PM (14:50), Nov. 7, 2015.

Herein, it has been described, by way of example, that a user terminal extracts a beacon ID from a received beacon signal, and stores the extracted beacon ID and reception time information about the beacon signal in a storage of the user terminal. However, the user terminal may measure the received signal strength of the beacon signal, and only if the measured signal strength is equal to or larger than a preset received signal strength, the user terminal may extract the beacon ID from the beacon signal, and store the extracted beacon ID. Or only if the extracted beacon ID matches to user-preset category information, the user terminal may store the beacon ID. For example, since a patient to take a medical checkup would visit only a doctor's office/examination room related to medical checkup items, category information of the user terminal may be preset to a doctor's office/examination room related to medical checkup items. In this case, only if the extracted beacon ID matches to a doctor's office/examination room related to medical checkup items, the user terminal stores the extracted beacon ID. Herein, the user terminal may set category information, for example, by an application related to recommendation of a moving line, installed in the user terminal.

If the patient which has visited the doctor's office A 402, the X-ray room B 404, and the specimen collection room C 406 wants to receive new moving line information about additional places to visit for a medical checkup, the patient transmits moving line information about the patient stored in the user terminal to the server installed at the information desk 408. That is, the user terminal transmits the pre-stored beacon IDs and the reception time information about the beacon signals including the beacon IDs to the server. Herein, the user terminal may additionally transmit user information. The user information may be, for example, a patient ID, a current/past medical history of the patient, medical records of the patient, and a doctor's note.

In addition, when transmitting the pre-stored beacon IDs and the reception time information about beacon signals including the beacon IDs, the user terminal may set a desired category, and selectively transmit only a beacon ID included in the set category, and reception time information about a beacon signal including the beacon ID to the server. Since FIG. 4 is based on the scenario in which a patient visits a hospital and is taking a medical checkup, the user terminal may transmit only a beacon ID matching to a doctor's office/examination room related to medical checkup items, and reception time information about a beacon signal including the beacon ID to the server, from among the pre-stored beacon IDs and the reception time information about beacon signals including the beacon IDs.

Upon receipt of the previous moving line information about the patient, that is, the beacon IDs and reception time information about beacon signals including the beacon IDs from the user terminal, the server detects doctor's offices/examination rooms that the patient has visited for a medical checkup based on information included in the beacon IDs, and detects a movement path of the patient and a time for which the patient has stayed in each doctor's office/examination room based on the reception time information about the beacon signals.

Upon detection of the movement path of the patient and the time for which the patient has stayed in each doctor's office/examination room, the server generates new moving line information to be provided to the patient, for an efficient medical checkup, and provides the generated new moving line information to the patient through the user terminal. The server basically generates the new moving line information in such a manner that the new moving line includes additional doctor's offices/examination rooms to visit. In FIG. 4, the new moving line is generated so that the patient may visit in the order of a CT room D 410→a doctor's office 412, and provided to the patient through the user terminal. Herein, the server may transmit, to the user terminal, information about the doctor's offices/examination rooms included in the generated new moving line, for example, information about things to be aware of to see a doctor or get a medical checkup, along with the information about the new moving line.

Figure 5:
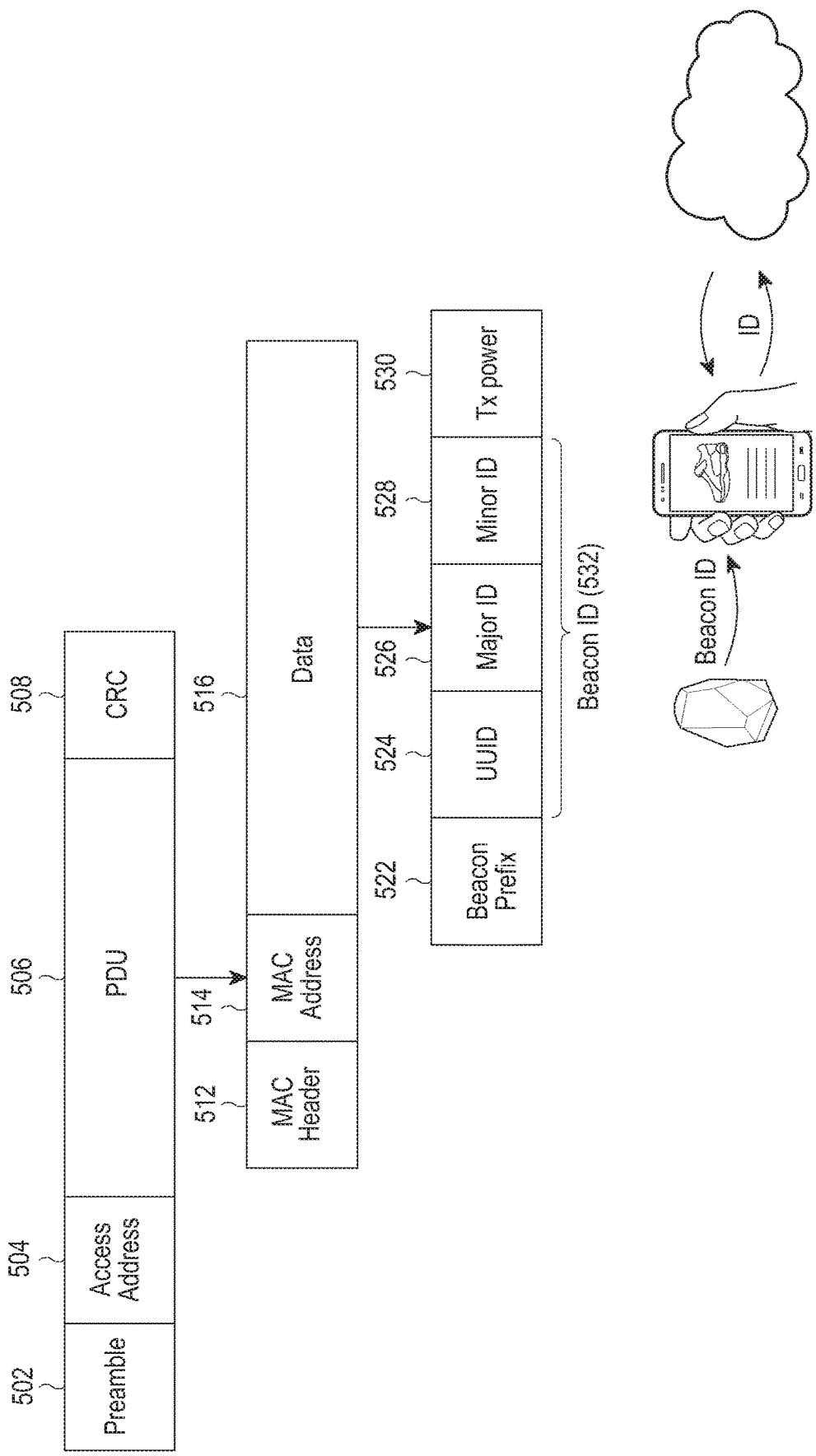
FIG. 5 is a diagram illustrating the structure of a beacon signal received at a user terminal in a system for providing new moving line information according to an embodiment of the present disclosure.

FIG. 5 is a diagram illustrating the structure of a beacon signal received by a user terminal in a system for providing a new moving line according to an embodiment of the present disclosure.

Referring to FIG. 5, a beacon signal received by a user terminal includes a preamble area 502, an access address area 504, a PDU area 506, and a CRC area 508. Herein, a beacon signal means a signal generated periodically from a signal generator, and is used to determine proximity of a user terminal to a specific area. In an embodiment of the present disclosure, a beacon signal is used to determine whether a user terminal has visited a specific area.

The PDU area 506 of the beacon signal includes a medium access control (MAC) header area 512, a MAC address area 514, and a data area 516. The data area 516 includes beacon ID information that a user terminal extracts from the beacon signal. Specifically, the data area 516 includes a beacon prefix area 522, a beacon ID area 532, and a transmission (Tx) power area 530.

The beacon ID area 532 includes a UUID area 524, a major ID area 526, and a minor ID area 528. For example, the UUID area 524 may include shopping mall information, the major ID area 526 may include shop information, and the minor ID area 528 may include brand information. In FIG. 5, it has been described by way of example that the UUID area 524 includes shopping mall information, the major ID area 526 includes shop information, and the minor ID area 528 includes brand information. However, the UUID area 524, the major ID area 526, and the minor ID area 528 may include other hierarchical information. The hierarchical information may include at least one of shopping mall information, shop information, brand information, or product information.

Figure 6:
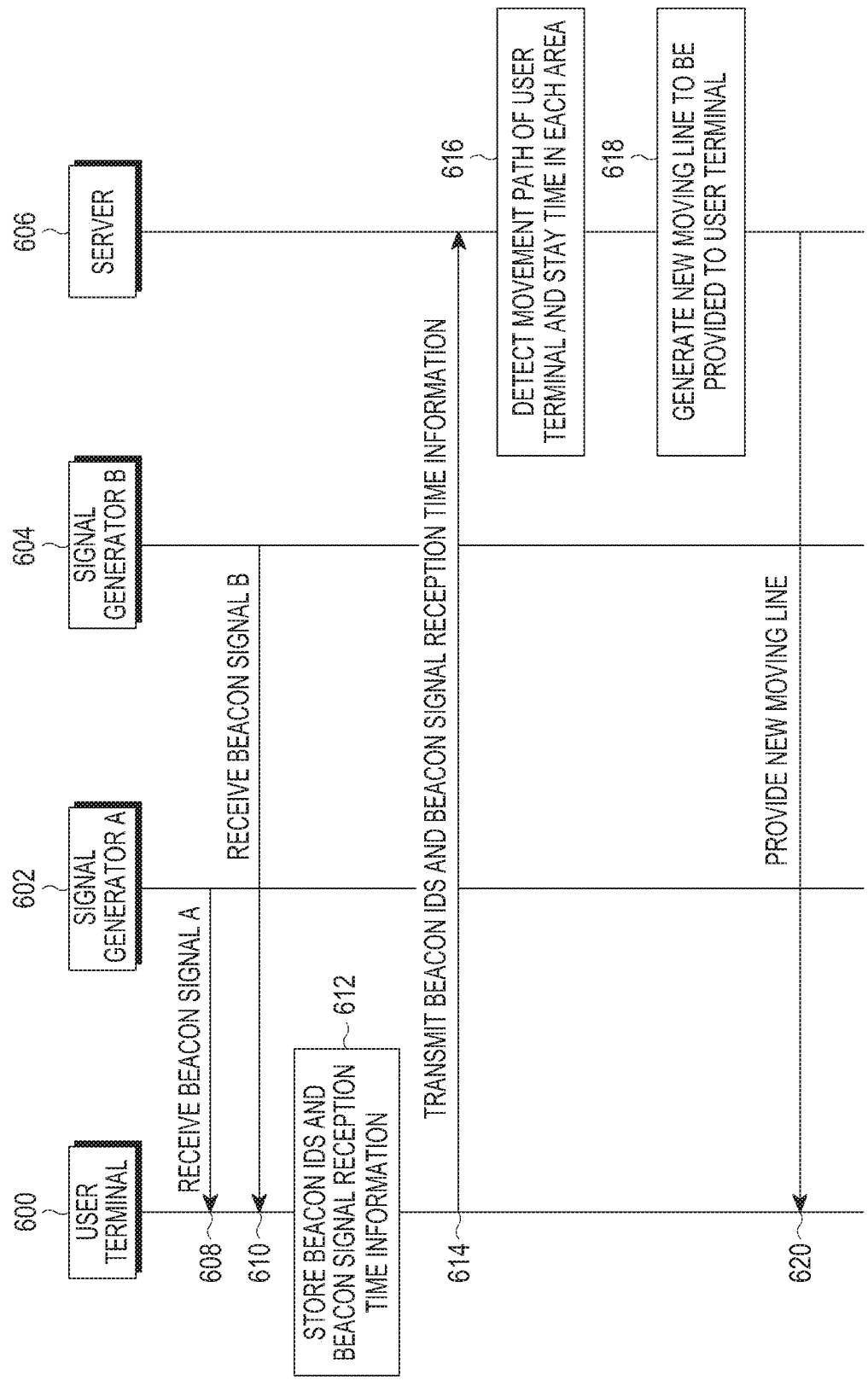
FIG. 6 is a diagram illustrating a signal flow for a process of providing new moving line information generated based on previous moving line information according to an embodiment of the present disclosure.

FIG. 6 is a diagram illustrating a signal flow for a process of providing new moving line information generated based on previous moving line information according to an embodiment of the present disclosure.

Referring to FIG. 6, a system for providing a new moving line according to an embodiment of the present disclosure may include a user terminal 600, a signal generator A 602, a signal generator B 604, and a server 606. The signal generator A 602 and the signal generator B 604 are installed in different geographical areas, the signal generator A 602 installed in an area A transmits a beacon signal A, and the signal generator B 604 installed in an area B transmits a beacon signal B. The beacon signal A is used to determine whether the user terminal 600 has visited the area A, and the beacon signal B is used to determine whether the user terminal 600 has visited the area B.

The user terminal 600 visiting the area A receives the beacon signal A from the signal generator A 602 in step 608, and the user terminal 600 visiting the area B receives the beacon signal B from the signal generator B 604 in step 610.

The user terminal 600 extracts a beacon ID from each of the beacon signals A and B received in steps 608 and 610, and stores the extracted beacon IDs and reception time information about the beacon signals in step 612. In FIG. 6, it has been described by way of example that after the user terminal 600 receives the beacon signal A and the beacon signal B, the user terminal 600 performs step 612. However, after receiving the beacon signal A, the user terminal 600 may extract the beacon ID from the beacon signal A, and store the extracted beacon ID and the reception time information about the beacon signal A. Subsequently, after receiving the beacon signal B, the user terminal 600 may extract the beacon ID from the beacon signal B, and store the extracted beacon ID and the reception time information about the beacon signal B.

In another example of step 612, the user terminal 600 may measure the signal strengths of the beacon signals A and B, extract a beacon ID from a beacon signal having a measured received signal strength equal to or larger than a user-preset received signal strength, and store the extracted beacon ID and reception time information about the beacon signal including the beacon ID.

Or the user terminal 600 may compare the extracted beacon ID with user-preset category information, and only if the extracted beacon ID matches to the preset category information, the user terminal 600 may store the extracted beacon ID and reception time information about the beacon signal including the beacon ID. If the system for providing a new moving line illustrated in FIG. 6 is used to enable a shopping mall customer to do an efficient shopping, the category information may include information about a product that the customer wants to purchase. Or if the system for providing a new moving line illustrated in FIG. 6 is used to efficiently arrange manpower in a building, the category information may include information about a division to which a worker belongs or a job of the worker. Or if the system for providing a new moving line illustrated in FIG. 6 is used to guide a patient to additional places to visit among examination rooms and doctor's offices, the category information may include information about a current/past medical history of the patient or a doctor's note.

The user terminal 600, which has stored the beacon IDs of the beacon signals A and B and the reception time information about the beacon signals A and B, transmits the stored beacon IDs and the reception time information about the beacon signals to the server 606 in step 614, thereby requesting new moving line information for additional areas to visit besides the areas A and B.

Herein, when requesting the new moving line information, the user terminal 600 may additionally transmit information about a user having the user terminal 600 as well as the above moving line information, that is, the beacon IDs and the beacon signal reception time information. If the system for providing a new moving line illustrated in FIG. 6 is used to enable a shopping mall customer to do an efficient shopping, the information related to the user may be a customer ID, membership (customer class) information about the user, information about a coupon available to the user, a previous purchase history, and so on. Or if the system for providing a new moving line illustrated in FIG. 6 is used to arrange manpower in a building, the information related to the user may be the worker ID, division, job, career, and skill of a worker. Or if the system for providing a new moving line illustrated in FIG. 6 is used to guide a patient in an examination room and a doctor's office to additional places to visit in a hospital, the information related to the user may be a patient ID, a current/past medical history of the patient, medical records of the patient, a doctor's note, and so on.

Further, when transmitting the pre-stored beacon IDs and the reception time information about the beacon signals including the beacon IDs in order to request the new moving line information, the user terminal 600 may selectively transmit, to the server 606, only a beacon ID matching to a preset category and reception time information about a beacon signal including the beacon ID.

Upon receipt of the moving line information, that is, the beacon IDs and the beacon signal reception time information from the user terminal 600, the server 606 detects a movement path of the user terminal 600 and a time for which the user has stayed in each area included in the movement path, based on the received moving line information in step 616.

Upon detection of the movement path of the user terminal 600 and the time for which the user terminal 600 has stayed in each area, the server 606 generates information about a new moving line to be provided to the user terminal 600 in step 618. In the case where the system for providing a new moving line illustrated in FIG. 6 is used to enable a shopping mall customer to do an efficient shopping, the server 606 determines additional shops that the user terminal 600 is supposed to visit among shops which have not been visited yet, in consideration of the movement path of the user terminal 600 and the time for which the user terminal 600 has stayed in each area, and generates information about a new moving line customized for the user based on the determination result. Herein, in the presence of additional information received from the user terminal 600, the server 606 may generate information about a new moving line in additional consideration of the received information. That is, the server 606 may generate the information about the new moving line in consideration of the additional information received from the user terminal 600, for example, a previous purchase history, membership information, and information about a coupon available to the user terminal 600 along with the movement path of the user terminal 600 and the time for which the user terminal 600 has stayed in each area.

Or if the system for providing a new moving line illustrated in FIG. 6 is used to efficiently arrange manpower in a building, the server 606 determines additional areas that the user terminal 600 is supposed to visit among areas which have not been visited yet, in consideration of the movement path of the user terminal 600 and the time for which the user terminal 600 has stayed in each area, and generates information about a new moving line customized for the user. Herein, the server 606 may generate the information about the new moving line in consideration of additional information received from the user terminal 600, for example, the worker ID, division, job, career, and skill of the worker.

Or if the system for providing a new moving line illustrated in FIG. 6 is used to guide a patient to additional places to visit among examination rooms and doctor's offices, the server 606 determines additional areas that the user terminal 600 is supposed to visit among areas which have not been visited yet, in consideration of a movement path of the user terminal 600 and a time for which the user terminal 600 has stayed in each area, detected in step 616, and generates information about a new moving line customized for the user based on the determination result. Herein, the server 606 may generate the information about the new moving line in consideration of additional information received from the user terminal 600, for example, a patient ID, a current/past medical history of the patient, medical records of the patient, and a doctor's note.

Then, the server 606 provides the new moving line information generated in step 618 to the user terminal 600 in step 620.

Figure 7:
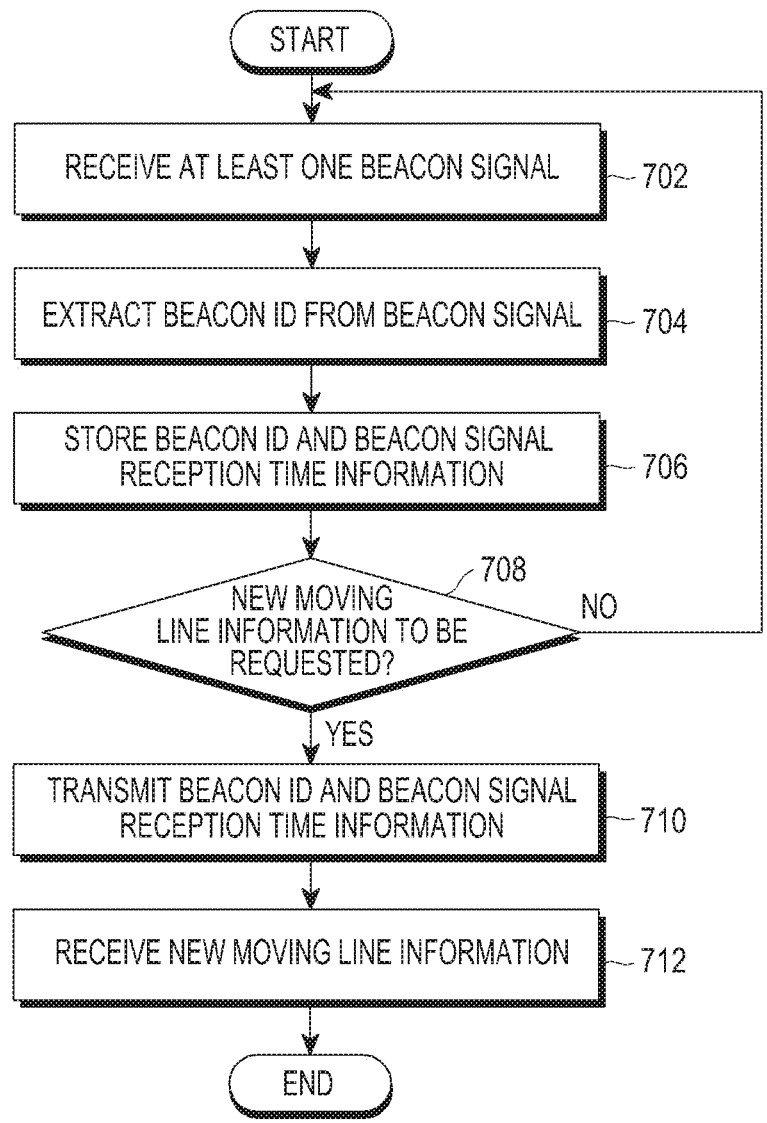
FIG. 7 is a flowchart illustrating an example of receiving, from a server, new moving line information generated based on previous moving line information by a user terminal according to an embodiment of the present disclosure.

FIG. 7 is a flowchart illustrating an example of receiving, from a server, new moving line information generated based on previous moving line information by a user terminal according to an embodiment of the present disclosure.

Referring to FIG. 7, the user terminal receives at least one beacon signal in step 702. The beacon signal is used to determine whether a user terminal has visited a specific area, and is transmitted from a signal generator installed in the specific area.

The user terminal extracts a beacon ID from each of the received at least one beacon signal in step 704, and stores the extracted beacon ID and reception time information about the at least one beacon signal in step 706. Herein, the user terminal may measure the received signal strength of each of the at least one beacon signal, extract a beacon ID from a beacon signal having a received signal strength equal to or larger than a predetermined received signal strength, and store the extracted beacon ID and reception time information about a beacon signal including the beacon ID. Or the user terminal may determine whether the extracted beacon ID matches preset category information, and only if the extracted beacon ID matches to the preset category information, the user terminal may store the beacon ID and the reception time information about the beacon signal including the beacon ID. The category information may be set to any of UUID information, major ID information, and minor ID information included in the beacon ID.

In step 708, the user terminal determines whether to request new moving line information. If the user terminal is to request new moving line information, the user terminal transmits, to the server, each beacon ID and reception time information about a beacon signal including the beacon ID, which are stored in step 706. As such, the user terminal may transmit the beacon ID and the reception time information about the beacon signal to the server according to the intention of the user terminal, thereby overcoming the problem that a user location is tracked irrespective of the intention of a user. Meanwhile, if the user terminal determines not to request new moving line information in step 708, the user terminal receives a beacon signal continuously in step 702.

In another example of step 710, the user terminal may request new moving line information by transmitting, to the server, only a beacon ID matching to a preset category and reception time information about a beacon signal including the beacon ID among the beacon IDs and the reception time information about the beacon signals including the beacon IDs stored in step 706.

Further, while not shown, the user terminal may transmit user information about a user having the user terminal along with the beacon IDs and the reception time information about the beacon signals including the beacon IDs.

Subsequently, the user terminal receives new moving line information from the server in step 712. Herein, a new moving line may be generated based on a movement path of the user terminal and a time for which the user terminal has stayed in each area, which have been detected from the beacon IDs and the reception time information about the beacon signals transmitted in step 710, and further in consideration of the user information.

Figure 8:
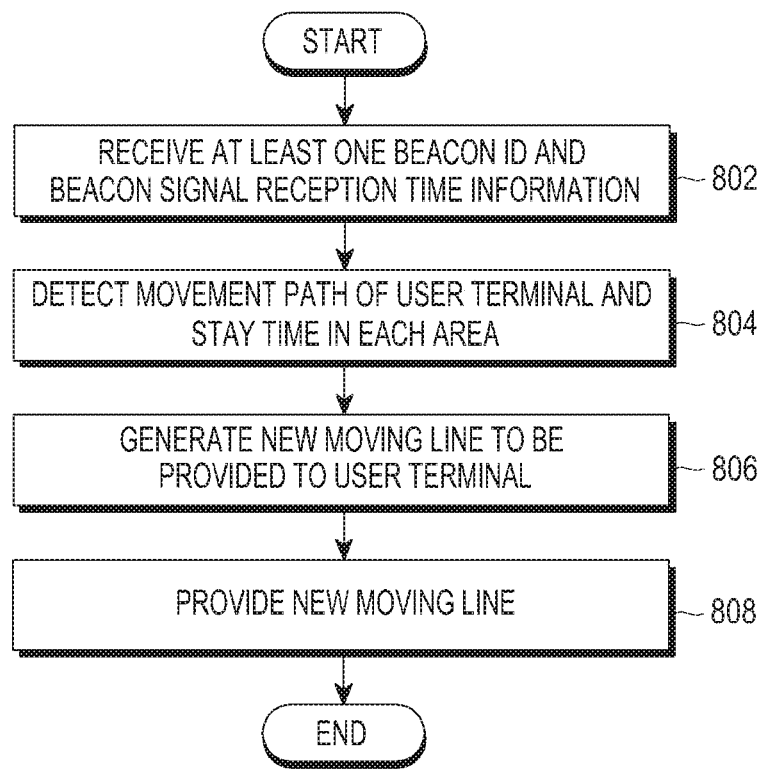
FIG. 8 is a flowchart illustrating an example of generating new moving line information based on previous moving line information about a user terminal, and providing the new moving line information to the user terminal by a server according to an embodiment of the present disclosure.

FIG. 8 is a flowchart illustrating an example of generating new moving line information based on previous moving line information about a user terminal, and providing the new moving line information to the user terminal by a server according to an embodiment of the present disclosure.

Referring to FIG. 8, the server receives, from the user terminal, at least one beacon ID and reception time information about at least one beacon signal corresponding to the at least one beacon ID in step 802. The at least one beacon signal is used to determine whether a user has visited a specific area, and the at least one beacon ID is information extracted from the at least one beacon signal. Further, the at least one beacon signal is transmitted from a signal generator installed in the specific area.

In step 804, the server detects a movement path of the user terminal and a time for which the user terminal has stayed in each area from the at least one beacon ID and the reception time information about the at least one beacon signal including the at least one beacon ID received from the user terminal.

In step 806, the server generates information about a new moving line to be provided to the user terminal, based on the movement path of the user terminal and the time for which the user terminal has stayed in each area, which have been detected in step 804. That is, the server generates the information about the new moving line so as to include information about additional areas for the user terminal to visit, among areas which the user terminal has not visited yet.

While not shown, the server may also receive, from the user terminal, user information related to a user having the user terminal along with the at least one beacon ID and the reception time information about the at least one beacon signal. In this case, the server generates the information about the new moving line in consideration of the user information as well as the movement path of the user terminal and the time for which the user terminal has stayed in each area.

In step 808, the server provides the information about the new moving line generated in step 806 to the user terminal.

Figure 9:
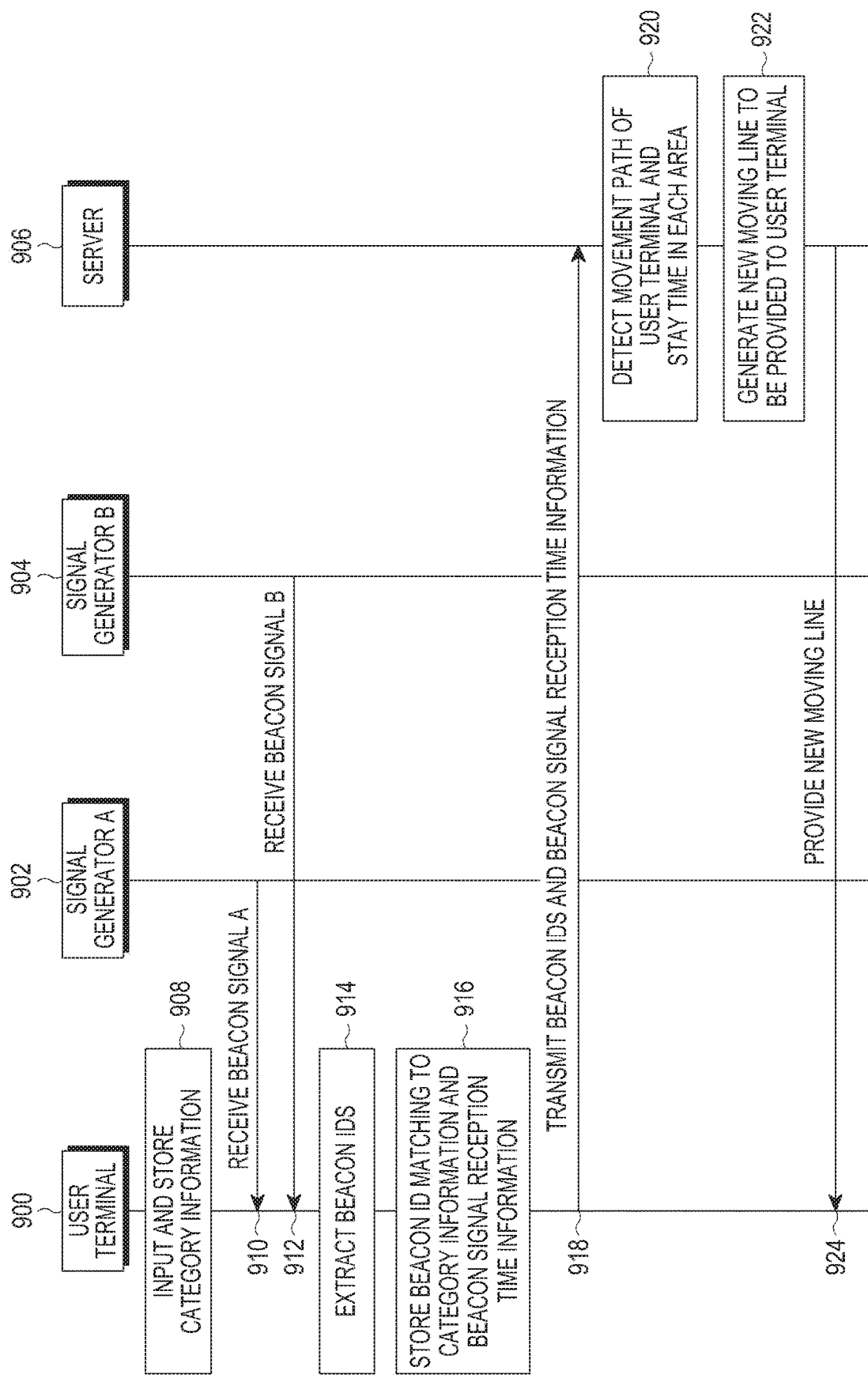
FIG. 9 is a diagram illustrating a signal flow for a process of providing new moving line information generated based on previous moving line information according to another embodiment of the present disclosure.

FIG. 9 is a diagram illustrating a signal flow for a process of providing new moving line information generated based on previous moving line information according to another embodiment of the present disclosure.

Referring to FIG. 9, a system for providing a new moving line according to an embodiment of the present disclosure may include a user terminal 900, a signal generator A 902, a signal generator B 904, and a server 906. The signal generator A 902 and the signal generator B 904 are installed in different geographical areas, the signal generator A 902 installed in an area A transmits a beacon signal A, and the signal generator B 904 installed in an area B transmits a beacon signal B. The beacon signal A is used to determine whether the user terminal 900 has visited the area A, and the beacon signal B is used to determine whether the user terminal 900 has visited the area B.

Upon input of category information from a user, the user terminal stores the input category information in step 908. If the system for providing a new moving line illustrated in FIG. 9 is used to enable a shopping mall customer to do an efficient shopping, the category information may include information about a product that a customer intends to purchase. Or if the system for providing a new moving line illustrated in FIG. 9 is used to arrange manpower efficiently in a building, the category information may include information about the division or job of a worker. Or if the system for providing a new moving line illustrated in FIG. 9 is used to guide a patient in an examination room and a doctor's office to an additional place to visit, the category information may include information about a current/past medical history of the patient or a doctor's note.

Then, the user terminal 900 visiting the area A receives the beacon signal A from the signal generator A 902 in step 910, and the user terminal visiting the area B receives the beacon signal B from the signal generator B 904 in step 912.

In step 914, the user terminal 900 extracts a beacon ID from each of the beacon signals A and B received in steps 910 and 912. The user terminal 900 determines whether the extracted beacon ID matches to the category information stored in step 908 in step 914, and stores a beacon ID matching to the category information and reception time information about a beacon signal including the beacon ID in step 916. With reference to FIG. 9, it has been described by way of example that after receiving the beacon signal A and the beacon signal B, the user terminal 900 performs steps 914 and 916. However, steps 914 and 916 may be performed respectively shortly after the user terminal 900 receives the beacon signal A and shortly after the user terminal 900 receives the beacon signal B.

In another example, the user terminal 900 may measure the signal strengths of the beacon signals A and B, extract a beacon ID from a beacon signal having a measured received signal strength equal to or larger than a user-preset received signal strength, and determine whether the extracted beacon ID matches to the pre-stored category information.

The user terminal 900, which has stored the beacon ID matching to the pre-stored category information and the reception time information about the beacon signal including the beacon ID, transmits the stored beacon ID and reception time information about the beacon signal to the server 906 in step 918, thereby requesting new moving line information for additional areas to visit besides the areas A and B.

Herein, when requesting new moving line information, the user terminal 900 may additionally transmit information about a user having the user terminal 900 as well as the above moving line information, that is, the beacon ID and the beacon signal reception time information. If the system for providing a new moving line illustrated in FIG. 9 is used to enable a shopping mall customer to do an efficient shopping, the information about the user may be a customer ID, membership (customer class) information, information about a coupon available to the user, a previous purchase history, and so on. Or if the system for providing a new moving line illustrated in FIG. 9 is used to efficiently arrange manpower in a building, the information about the user may be, for example, the worker ID, division, job, career, and skill of a worker. Or if the system for providing a new moving line illustrated in FIG. 9 is used to guide a patient in an examination room and a doctor's office to additional places to visit in a hospital, the information about the user may be a patient ID, a current/past medical history of the patient, medical records of the patient, a doctor's note, and so on.

Further, when transmitting the pre-stored beacon IDs and the reception time information about the beacon signals including the beacon IDs in order to request new moving line information, the user terminal 900 may selectively transmit, to the server, only a beacon ID matching to a preset category and reception time information about a beacon signal including the beacon ID.

Upon receipt of the moving line information, that is, the beacon IDs and the beacon signal reception time information from the user terminal 900, the server 906 detects a movement path of the user terminal 900 and a time for which the user has stayed in each area included in the movement path, based on the received moving line information in step 920.

Upon detection of the movement path of the user terminal 900 and the time for which the user terminal 900 has stayed in each area, the server 906 generates information about a new moving line to be provided to the user terminal 900 in step 922. In the case where the system for recommending a new moving line illustrated in FIG. 9 is used to enable a shopping mall customer to do an efficient shopping, the server 906 determines additional shops that the user terminal 900 is supposed to visit among shops which have not been visited yet, in consideration of the movement path of the user terminal 900 and the time for which the user terminal 900 has stayed in each area, detected in step 920, and generates information about a new moving line customized for the user based on the determination result. Herein, in the presence of additional information received from the user terminal 900, the server 906 may generate information about a new moving line further in consideration of the received additional information. That is, the server 906 may generate the information about the new moving line in consideration of the additional information received from the user terminal 900, for example, a previous purchase history, membership information, and information about a coupon available to the user terminal 900 along with the movement path of the user terminal 900 and the time for which the user terminal 900 has stayed in each area.

Or if the system for providing a new moving line illustrated in FIG. 9 is used to efficiently arrange manpower in a building, the server 906 determines additional areas that the user terminal 900 is supposed to visit among areas which have not been visited yet, in consideration of the movement path of the user terminal 900 and the time for which the user terminal 900 has stayed in each area, detected in step 920 and generates information about a new moving line customized for the user based on the determination result. Herein, the server 906 may generate the information about the new moving line in consideration of additional information received from the user terminal 900, for example, the division, job, career, and skill of a worker.

Or if the system for providing a new moving line illustrated in FIG. 9 is used to guide a patient to additional places to visit among examination rooms and doctor's offices, the server 906 determines additional areas that the user terminal 900 is supposed to visit among areas which have not been visited yet, in consideration of the movement path of the user terminal 900 and the time for which the user terminal 900 has stayed in each area, detected in step 920, and generates information about a new moving line customized for the user based on the determination result. Herein, the server 906 may generate the information about the new moving line in consideration of additional information received from the user terminal 900, for example, a patient ID, a current/past medical history of the patient, medical records of the patient, and a doctor's note.

Then, the server 906 provides the new moving line information generated in step 922 to the user terminal 900 in step 924.

Figure 10:
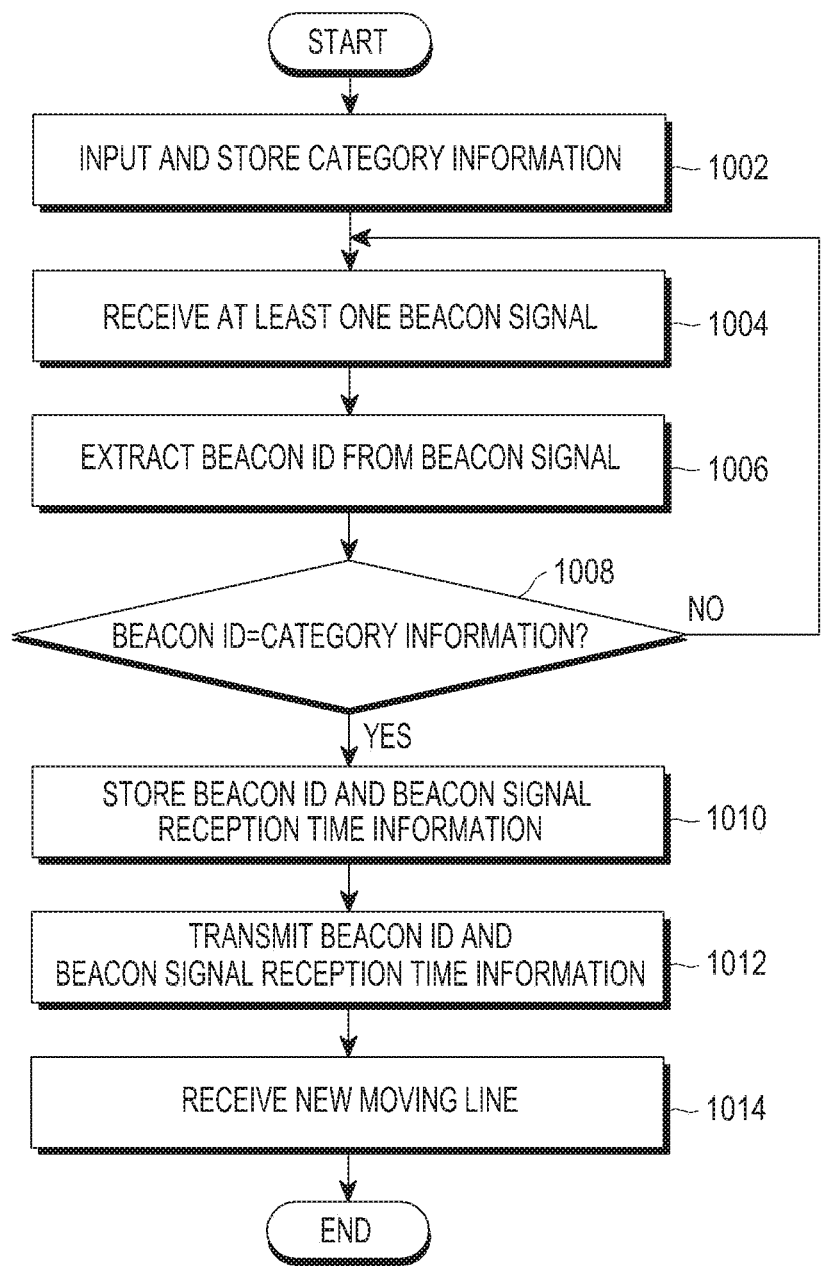
FIG. 10 is a flowchart illustrating an example of receiving, from a server, new moving line information generated based on previous moving line information by a user terminal according to another embodiment of the present disclosure.

FIG. 10 is a flowchart illustrating an example of receiving, from a server, new moving line information generated based on previous moving line information by a user terminal according to another embodiment of the present disclosure.

Referring to FIG. 10, upon input of category information from a user, the user terminal stores the input category information in step 1002 and receives at least one beacon signal in step 1004. The at least one beacon signal is used to determine whether a user terminal has visited a specific area, and is transmitted from a signal generator installed in the specific area.

In step 1006, the user terminal extracts a beacon ID from each of the received at least one beacon signal. Herein, the user terminal may measure the signal strength of each of the at least one beacon signal, and extract a beacon ID only from a beacon signal having a measured received signal strength equal to or larger than a user-preset received signal strength.

In step 1008, the user terminal determines whether each of the extracted beacon IDs matches the category information stored in step 1002. If the extracted beacon ID matches to the stored category information, the user terminal stores the extracted beacon ID and reception time information about a beacon signal corresponding to the beacon ID in step 1010. The category information may be set to any of UUID information, major ID information, and minor ID information included in the beacon ID. On the other hand, if the extracted beacon ID does not match to the pre-stored category information in step 1008, the user terminal receives a beacon signal continuously in step 1004.

Subsequently, when determining to request new moving line information, the user terminal transmits the beacon ID and the reception time information about the beacon signal including the beacon ID, stored in step 1010 to the server in step 1012. While not shown, the user terminal may additionally transmit information about a user having the user terminal as well as the beacon ID and the beacon signal reception time information.

In step 1014, the user terminal receives new moving line information from the server. Herein, a new moving line may be generated based on a movement path of the user terminal and a time for which the user terminal has stayed in each area, detected from the beacon ID and the reception time information about the beacon signal including the beacon ID in step 1012, and further in consideration of user information.

Figure 11:
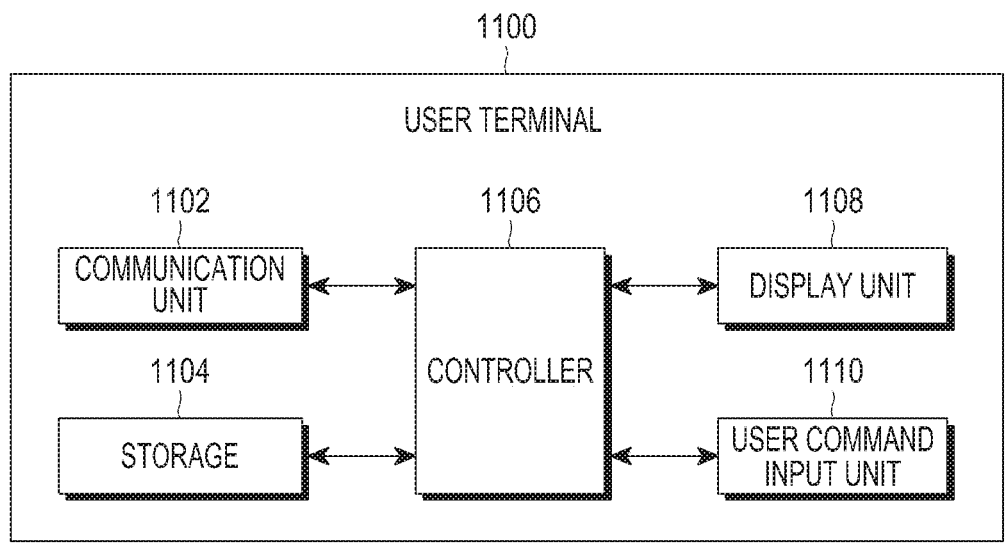
FIG. 11 is a block diagram of a user terminal according to an embodiment of the present disclosure.

FIG. 11 is a block diagram of a user terminal according to an embodiment of the present disclosure.

Referring to FIG. 11, a user terminal 1100 includes a communication unit 1102, a storage 1104, a controller 1106, a display unit 1108, and a user command input unit 1110.

The controller 1106 provides overall control to the user terminal 1100, and particularly performs an operation of extracting a beacon ID from a beacon signal, and comparing the extracted beacon ID with category information stored in the storage 1104. Besides, the controller 1106 provides overall control to operations related to a technique of recommending a new moving line according to an embodiment of the present disclosure. The operations related to the technique of recommending a new moving line have been described before with reference to FIGS. 1 to 7, 9, and 10, and thus a detailed description of the operations is not provided herein.

The communication unit 1102 transmits and receives various pieces of information required for communication with a server under the control of the controller 1106. Particularly, the communication unit 1102 transmits information stored in the storage 1104, and receives new moving line information from the server. The information transmitted and received by the communication unit 1102 has been described before with reference to FIGS. 1 to 7, 9, and 10, and thus a detailed description of the information is not provided herein.

The user command input unit 1110 receives commands, particularly category information from a user.

The storage 1104 stores all information of the user terminal 1100, particularly beacon identification information (beacon IDs, or the like), category information received from the user, reception time information about beacon signals, and so on.

The display unit 1108 displays new moving line information received from the server.

Figure 12:
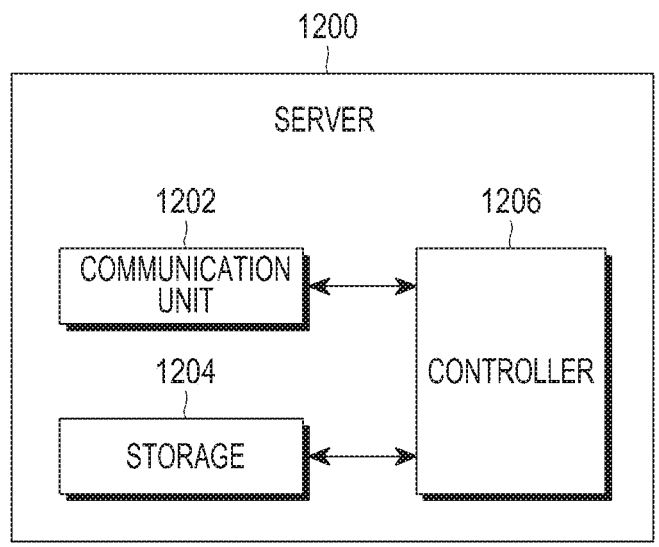
FIG. 12 is a block diagram of a server according to an embodiment of the present disclosure.

FIG. 12 is a block diagram of a server according to an embodiment of the present disclosure.

Referring to FIG. 12, a server 1200 includes a communication unit 1202, a storage 1204, and a controller 1206. The server 1200 functions to store and process data in order to provide a service to another device over a network. For example, the server 1200 may include a management server in a retail shop, a server in a shop of a service provider, or a cloud server of the service provider.

The controller 1206 provides overall control to the server 1200, and particularly performs an operation of generating a new moving line based on moving line information received from a user terminal, an operation of matching new moving line information to user information, and so on. Besides, the controller 1206 provides overall control to operations related to a technique of recommending a new moving line according to an embodiment of the present disclosure. The operations related to the technique of recommending a new moving line have been described before with reference to FIGS. 1 to 6, 8, and 9, and thus a detailed description of the operations is not provided herein.

The communication unit 1202 transmits and receives various pieces of information required for communication with a user terminal under the control of the controller 1206. Particularly, the communication unit 1202 receives moving line information from the user terminal, and transmits new moving line information generated by the controller 1206. The information transmitted and received by the communication unit 1202 has been described before with reference to FIGS. 1 to 6, 8, and 9, and thus a detailed description of the information is not provided herein.

The storage 1204 stores all information of the server 1200, particularly beacon identification information (beacon IDs, or the like) received from the user terminal, per-beacon ID product information, per-product coupon information, promotion information, and so on.

From a specific aspect, various embodiments of the present disclosure can be implemented as computer-readable code in a computer-readable recoding medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve various embodiments of the present disclosure.

The apparatus and method according to various embodiments of the present disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as CD, DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to an embodiment of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method for receiving new moving line information by a terminal, the method comprising:
   identifying category information related to a user;
   generating previous moving line information based on a movement path of the terminal in a specific space;
   in response to a request for new moving line information for the specific space, transmitting the previous moving line information to a server;
   receiving, from the server, new moving line information generated based on the previous moving line information, and
   displaying the new moving line information received from the server,
   wherein the new moving line information is generated based on the movement path of the terminal and a time for which the terminal has stayed in each area included in the movement path of the terminal identified from the previous moving line information, the new moving line information including information about at least one additional area to visit among areas which the terminal has not visited yet, and
   wherein the generation of the previous moving line information comprises:
      receiving wireless communication signals from signal generators installed in the movement path of the user terminal,
      extracting identities (IDs), from the wireless communication signals, respectively, and determining whether each of the extracted IDs corresponds to the category information, and
      in response to each of the extracted IDs corresponding to the category information, generating the previous moving line information based on each of the extracted IDs and information about a time of receiving a wireless communication signal corresponding to each of the extracted IDs.

2. The method of claim 1, further comprising transmitting, to the server, information about a user of the terminal as the previous moving line information,
wherein the information about the user includes at least one of information about a movement path of the user, information about a time for which the user has stayed in each area, identification information of the user, personal information of the user, authority information of the user, or history information related to each area.

3. The method of claim 1, wherein the generation of the previous moving line information further comprises:
receiving at least one wireless communication signal from at least one signal generator installed in the movement path of the terminal;
measuring a received signal strength of the at least one wireless communication signal;
extracting an ID from a wireless communication signal having a received signal strength equal to or larger than a predetermined received signal strength; and
generating the previous moving line information based on the extracted ID and information about a time of receiving a wireless communication signal corresponding to the extracted ID.

4. A method for transmitting new moving line information by a server, the method comprising:
receiving, from a terminal, previous moving line information generated based on a movement path of the terminal in a specific space;
in response to receiving a request for new moving line information for the specific space, identifying the movement path of the terminal and a time for which the terminal has stayed in each area included in the movement path of the terminal, based on the previous moving line information;
generating new moving line information including information about at least one additional area to visit among areas which the terminal has not visited yet, based on the movement path of the terminal and the time for which the terminal has stayed in each area in the movement path; and
transmitting the new moving line information to the terminal,
wherein the previous moving line information is based on an identity (ID) extracted from each of wireless communications signal received from signal generators installed in the movement path of the terminal by the terminal, and information about a time of receiving a wireless communication signal corresponding to the extracted ID, the extracted ID corresponding to category information related to a user.

5. The method of claim 4, wherein the previous moving line information includes an identity (ID) extracted from each of at least one wireless communication signal received from at least one signal generator installed in the movement path of the terminal by the terminal, and information about a time of receiving a wireless communication signal corresponding to the extracted ID.

6. The method of claim 5, wherein the extracted ID is one of an ID corresponding to pre-stored category information determined by the terminal or an ID of a wireless communication signal having a received signal strength measured by the terminal equal to or larger than a predetermined received signal strength.

7. The method of claim 4, further comprising:
receiving, from the terminal, information about a user of the terminal as the previous moving line information,
wherein the information about the user includes at least one of information about a movement path of the user, information about a time for which the user has stayed in each area, identification information of the user, personal information of the user, authority information of the user, or history information related to each area.

8. A terminal, the terminal comprising:
a display;
a transceiver; and
a processor configured to:
identify category information related to a user;
generate previous moving line information based on a movement path of the terminal in a specific space,
in response to a request for new moving line information for the specific space, transmit, using the transceiver, the generated previous moving line information to a server,
receive, using the transceiver, from the server, new moving line information generated based on the transmitted previous moving line information, and
display, on the display, the new moving line information,
wherein the new moving line information is generated based on the movement path of the terminal and a time for which the terminal has stayed in each area included in the movement path of the terminal identified from the previous moving line information, the new moving line information including information about at least one additional area to visit among areas which the terminal has not visited yet, and
wherein the processor is further configured to:
receive wireless communication signals from signal generators installed in the movement path of the user terminal,
extract identities (IDs), from the wireless communication signals, respectively, and determine whether each of the extracted IDs corresponds to the category information, and
in response to each of the extracted IDs corresponding to the category information, generate the previous moving line information based on each of the extracted IDs and information about a time of receiving a wireless communication signal corresponding to each of the extracted IDs.

9. The terminal of claim 8,
wherein the processor is further configured to control the transceiver to transmit, to the server, information about a user of the terminal as the previous moving line information, and
wherein the information about the user includes at least one of information about a movement path of the user, information about a time for which the user has stayed in each area, identification information of the user, personal information of the user, authority information of the user, or history information related to each area.

10. The terminal of claim 8, wherein the processor is further configured to:
control the transceiver to receive at least one wireless communication signal from at least one signal generator installed in the movement path of the terminal,
measure a received signal strength of the at least one wireless communication signal, extract an ID from a wireless communication signal having a received signal strength equal to or larger than a predetermined received signal strength, and generate the previous moving line information based on the extracted ID and information about a time of receiving a wireless communication signal corresponding to the extracted ID.

11. A server, the server comprising:

a transceiver; and a processor configured to:
- receive, using the transceiver, from a terminal, previous moving line information generated based on a movement path of the terminal in a specific space,
- in response to receiving a request for new moving line information for the specific space, identify the movement path of the terminal and a time for which the terminal has stayed in each area included in the movement path of the terminal, based on the previous moving line information,
- generate new moving line information including information about at least one additional area to visit among areas which the terminal has not visited yet, based on the movement path of the terminal and the time for which the terminal has stayed in each area in the movement path, and
- transmit, using the transceiver, the generated new moving line information to the terminal, wherein the previous moving line information is based on an identity (ID) extracted from each of wireless communications signal received from signal generators installed in the movement path of the terminal by the terminal, and information about a time of receiving a wireless communication signal corresponding to the extracted ID, the extracted ID corresponding to category information related to a user.

12. The server of claim 11, wherein the extracted ID is one of an ID corresponded to pre-stored category information determined by the terminal or an ID of a wireless communication signal having a received signal strength measured by the terminal equal to or larger than a predetermined received signal strength.

13. The server of claim 11,
wherein the processor is further configured to control the transceiver to receive, from the terminal, information about a user of the terminal as the previous moving line information, and
wherein the information about the user includes at least one of information about a movement path of the user, information about a time for which the user has stayed in each area, identification information of the user, personal information of the user, authority information of the user, or history information related to each area.

14. The server of claim 11, wherein the processor is further configured to generate new moving line information based on information associated with a shop in a movement path of the new moving line information including at least one of a promotion event, a sale, or price information.

* * * * *